United States Patent [19]

Lee et al.

[11] 4,243,127
[45] Jan. 6, 1981

[54] CONTROL SYSTEM FOR AUTOMATICALLY ACTUATING VEHICLE BRAKES

[75] Inventors: Arthur L. Lee; Arthur B. Coval, both of Columbus, Ohio

[73] Assignee: A. L. Lee Corporation, Columbus, Ohio

[21] Appl. No.: 941,201

[22] Filed: Sep. 11, 1978

Related U.S. Application Data

[63] Continuation-in-part of Ser. No. 702,396, Jul. 6, 1976, Pat. No. 4,113,076.

[51] Int. Cl.³ .............................................. B60K 41/20
[52] U.S. Cl. ...................................................... 192/4 A
[58] Field of Search ................ 192/4 A, 4 R, 2, 13 A; 74/843, 846

[56] References Cited

U.S. PATENT DOCUMENTS

| | | | |
|---|---|---|---|
| 2,200,878 | 5/1940 | Farris | 192/13 A |
| 2,690,533 | 9/1954 | Marco | 192/2 X |
| 2,968,967 | 1/1961 | Ross | 192/4 A |
| 3,235,042 | 2/1966 | Ulinski | 192/2 |
| 3,589,484 | 6/1971 | Lammers | 192/4 A |
| 3,854,559 | 12/1974 | Talak | 192/4 A |
| 3,978,946 | 9/1976 | Ream | 192/4 A |

*Primary Examiner*—George H. Krizmanich
*Attorney, Agent, or Firm*—Stanley J. Price, Jr.; John M. Adams

[57] ABSTRACT

A motor drives a pump to provide fluid under pressure in a closed hydraulic circuit through a pilot valve to a change speed clutch valve and a directional valve of a multi-speed transmission for an electrically powered vehicle, such as a mine haulage vehicle. The multi-speed transmission is connected by an output shaft to the driven wheels of the vehicle. A braking force is applied to the driven wheels by a hydraulically operated service brake to effect routine stopping of the vehicle. Under emergency conditions an emergency brake applies a braking force to the driven wheels by operation of a panic bar positioned in the operator's compartment. A brake valve connected to the panic bar maintains a preselected fluid pressure in the hydraulic circuit of the emergency brake to retain the brake in a released position. The hydraulic circuit is interlocked through the pilot valve to the transmission clutch and direction valves. Depressing the panic bar actuates the brake valve to engage the emergency brake and simultaneously actuate the pilot valve to interrupt fluid flow to the respective valves of the transmission. Transmission of power to the driven wheels is terminated, and the vehicle is stopped. Actuation of the brake valve also opens the main contactors of the electrical controller that supplies electrical power to the traction motors to stop the motors. A safety brake valve is connected to the hydraulic circuit in series with the brake valve and is operable when the traction motors are stopped routinely or by application of the emergency brake to prevent restarting the traction motors and moving the vehicle until the emergency brake is manually disengaged.

7 Claims, 6 Drawing Figures

CONTROL SYSTEM FOR AUTOMATICALLY ACTUATING VEHICLE BRAKES

CROSS REFERENCE TO RELATED APPLICATION

This application is a continuation-in-part of application, Ser. No. 702,396, filed on July 6, 1976, entitled "Interrelated Controls For Vehicle Brakes, Transmission And Motor", now U.S. Pat. No. 4,113,076.

BACKGROUND OF THE INVENTION

1. Field of the Invention

This invention relates to an automatically actuated brake control system for an automotive vehicle and more particularly to a brake system adapted for use on a mine haulage vehicle in which a hydraulically controlled emergency brake is interlocked with the transmission of power to the driven wheels so that application of the emergency brake or stopping the traction motors prevents restarting of the traction motors until the emergency brake is manually disengaged.

2. Description of the Prior Art

In underground mining operations, mine haulage vehicles commonly known as "shuttle cars" are employed to transfer loose material dislodged from the mine face rearwardly to a discharge point where the material is transferred onto a conveyor belt that transports the material from the mine. The shuttle car may be electrically driven such as by A.C. or D.C. electric motors or propelled by a diesel engine. A fluid actuated braking system incorporated within a closed hydraulic circuit on the vehicle is operable to apply a braking force to the driven wheels of the vehicle. The braking system is utilized as a service brake on a routine stop, start basis and is actuated in a conventional manner, as by a foot pedal, to energize a master cylinder that pressurizes a conduit to supply fluid to the brakes. The brakes frictionally engage the driven wheels to slow the vehicle or bring the vehicle to a stop.

Operation of the service brakes requires a continuous supply of pressurized fluid. A malfunction of the master cylinder or fluid pumps that generate the required hydraulic pressure may render the service brake inoperable. Therefore, an emergency brake is provided for bringing the vehicle to a stop. Examples of known brake control systems are disclosed in the following U.S. Pat. Nos.: 2,690,533; 2,968,967; 3,235,042; 3,589,484; 3,854,559; and 3,978,946.

It is the conventional practice to actuate the emergency brake through an operator controllable member, such as a panic bar, positioned in the operator's compartment of the vehicle. Depressing the panic bar releases the hydraulic pressure in the hydraulic circuit that maintains the emergency brakes in a normally de-energized state. Thus, removal of hydraulic pressure from the emergency brake actuates the brake to bring the vehicle to a stop. The practice of actuating the emergency brake through the convenience of a panic bar invites the operator to utilize the emergency brake on a routine basis as a replacement for the service brake. Consequently, the emergency brake is subjected to excessive wear. Such misuse of the emergency brake on a routine basis decreases the overall effectiveness of the emergency brake possibly rendering the emergency brake inoperable in emergency situations.

Another problem encountered with conventional emergency brakes of an electrically powered shuttle car is the loss of brake release pressure or inadequate pressure for release of the emergency brakes which occurs as a result of pump failure or electrical power failure. In the event there is inadequate pressure for brake release or a total loss of pressure for brake release, the emergency brake remains engaged when tramming of the vehicle is resumed. This subjects the emergency brake to undesirable wear. Furthermore, the application of the emergency brake requires excessively high fluid pressure in the control circuit. The operator must raise the fluid pressure in the control circuit or monitor the control circuit for leaks to assure that the pressure does not gradually diminish and result in unintended brake application, which may be partial or total.

In many instances it is desirable to maintain the vehicle immovable while performing such operations as unloading the boom and running the conveyor to unload while the vehicle is positioned on an unloading ramp. In such an instance it is essential that the emergency brake be fully engaged to prevent movement of the vehicle while these operations are carried out. To assure that the emergency brake remains engaged when the vehicle is positioned on an incline, a parking lever associated with the emergency brake allows the operator to park the vehicle while other operations are conducted. Disconnecting the main contactors of the electrical controller will also prevent the tramming of the vehicle when positioned on a grade. However, with conventional shuttle cars a solenoid brake operating valve is connected to the main contactors and functions to release the brakes. When electrical power is restored by closing of the contacts within the controller to operate, for example the conveyor, the solenoid valve is energized to release the brakes. This presents a hazardous condition particularly when the vehicle is parked on a grade or ramp.

There is need to provide in a mine haulage vehicle a brake system in which the emergency brake is limited to emergency use only and not as a service brake. Furthermore, operation of the emergency brake should be interrelated with restarting of the traction motors once they are stopped so that the emergency brake is automatically actuated upon termination of operation of the traction motors requiring that the emergency brake be manually disengaged before the traction motors can be restarted.

SUMMARY OF THE INVENTION

In accordance with the present invention there is provided a control system for automatically actuating vehicle brakes that includes a propelling mechanism for the vehicle. A fluid pressure operated control means is drivingly connected to the propelling mechanism. A fluid actuated brake means is operable to engage the propelling means to brake the vehicle. A brake actuator valve is operatively associated with the fluid actuated brake means. A fluid circuit controls the flow of fluid under pressure between a source of pressurized fluid and the brake actuator valve, the fluid actuated brake means, and the fluid pressure operated control means. The brake actuator valve is normally positioned in a brake disengaged position to supply the fluid actuated brake means and the fluid pressure operated control means with fluid under pressure to maintain the fluid actuated brake means in a disengaged position with respect to the propelling means and to supply drive to the propelling mechanism. The brake actuator valve is operable upon actuation to move to a brake engaged position and thereby vent the fluid under pressure from the fluid actuated brake means and from the pressure operated control means so that the fluid actuated brake means engages the propelling mechanism to brake the vehicle and to interrupt drive to the propelling mechanism. A safety brake valve is operatively associated with the brake actuator valve. The safety brake valve is operable to maintain the brake actuator valve in a brake disengaged position when fluid under pressure is supplied to the pressure operated control means. The safety brake valve is actuated when the fluid under pressure is vented from the fluid pressure operated control means and the vehicle is stopped to move the brake actuator valve to a brake engaged position and thereby prevent restarting of the vehicle until the fluid under pressure is returned to the pressure operated control means.

The brake actuator valve and the safety brake valve are normally maintained in a first or the disengaged position to permit transmission of power to the propelling mechanism. The brake actuator valve and the safety brake valve are movable to a second or the brake engaged position upon actuation of a brake actuator lever. The brake actuator lever is connected to the brake actuator valve. The brake actuator lever is arranged to manually actuate the brake actuator valve and vent fluid under pressure from the fluid actuated braking means and the fluid pressure operated control means. With this arrangement the safety brake valve is moved to a second position interrupting flow of fluid under pressure through the fluid circuit to prevent operation of the fluid operated control means and propelling mechanism and accordingly prevent movement of the vehicle.

The propelling mechanism is restored to operation permitting movement of the vehicle by manually moving a brake reset lever connected to the brake actuator valve from a park position to a run position. When the brake actuator lever is moved or in the event of electrical power termination or a power failure the safety brake valve is automatically actuated and the brake reset lever is moved from a run position to a park position. This maintains the brake actuator valve and the safety brake valve in the brake engaged position. Thus, the vehicle power is terminated and restoration of propelling power to move the vehicle requires the manual operation of moving the brake reset lever from the park position to the run position in order to return the safety brake valve to the brake disengaged position. This permits the fluid under pressure to be restored to the fluid circuit and supplied to the fluid pressure operated control means for operation of the propelling mechanism. With this arrangement the safety brake valve and the vehicle braking are interlocked with the power transmission of the vehicle so that upon actuation of the brake actuator valve and the safety brake valve the power transmission is terminated requiring restarting of the vehicle. In addition when the vehicle is shut down, the safety brake valve is automatically actuated upon a preselected reduction of fluid pressure in the fluid circuit so the fluid actuated brake means is actuated to engage the propelling means.

In another embodiment of the present invention the fluid circuit includes a pump which is operated by a motor to supply fluid under pressure to a closed hydraulic system that maintains a preselected fluid pressure for operation of the fluid pressure operated control means. The fluid pressure operated control means includes a change speed clutch valve and a forward and reverse valve that are hydraulically actuated to, in turn, actuate the clutches of a multi-speed transmission. The multi-speed transmission is connected by an output shaft to the propelling mechanism that includes driven wheels. A braking mechanism for routine stopping and slowing the vehicle, such as a service brake, is operated by the vehicle operator to apply a braking force to the driven wheels. The control system of the present invention controls operation of the emergency brake for the vehicle. In the event the emergency brakes are activated by depressing the brake actuator lever or electrical power is terminated or a power failure occurs to actuate the safety brake valve the emergency brakes are applied to stop the vehicle. Before the vehicle can be moved the brake reset lever must be manually moved to open the brake actuator valve and the safety brake valve to restore fluid pressure to the hydraulic circuit of the system.

A pilot operated valve in the hydraulic circuit controls the flow of pressurized fluid from the pump to the change speed clutch valve and the forward and reverse valve. The pilot operated valve is interlocked with the valve device for actuating the emergency brake. The brake actuator lever for actuating the brake actuate valve to apply the emergency brake includes a panic bar that when depressed by the operator removes fluid pressure from the pilot valve and the emergency brake. This operation results in application of the emergency brake and deactuation of the change speed clutch valve and the forward and reverse valve to interrupt transmission of power to the driven wheels. Thus, actuation of the panic bar not only applies the emergency brake but also interrupts the transmission of power to the driven wheels and prevents movement of the vehicle by merely restoring the panic bar to its normal position.

In the second embodiment operation of the panic bar terminates the flow of electric current to an electrical controller that supplies electric power to the traction motors. Accordingly, the circuit to the electrical controller is opened and the flow of current to the traction motors is interrupted. Then to resume movement of the vehicle once the emergency braking mechanism has been actuated, it is necessary to first manually open the safety brake valve by moving the brake reset lever from the park position to the run position and second restore electrical power to the traction motors by manually restarting the motors at the controller.

By interlocking the application of the emergency brake with the operation of the multi-speed transmission and the supply of energizing current through the electrical controller to the traction motors, the emergency brake is restricted to emergency use only. With this arrangement the panic bar may not be operated for routine stopping of the vehicle. Operation of the panic bar automatically actuates the safety brake valve to interrupt transmission of power to the driven wheels requiring that the operator initiate a start-up procedure in order to restore tramming power to the vehicle.

The brake system of the present invention is adapted for use on automotive vehicles and is particularly adaptable for use with the brake system of a mine haulage vehicle, such as a "shuttle car" to transfer mined material in underground mines. With a shuttle car, the hydraulic pump supplies pressurized fluid for the operation of other fluid actuated devices on the vehicle such as the cable reel, conveyor, power steering, and boom control. However, the hydraulic pressure required to carry out the operation of these devices is entirely independent of the hydraulic system for actuating the emergency brake and transmitting power through the fluid circuit and the fluid pressure operated control means to the propelling devices. Thus, actuation of the emergency brake and termination of power to the propelling devices does not interrupt operation of the auxiliary devices. The functions of operating the conveyor, maintaining the tension on the cable reel, and lifting or holding the boom may be carried out when the vehicle is maintained immovable by application of emergency brake and interruption of power to the driven wheels.

Accordingly, the principal object of the present invention is to provide a control system for automatically actuating brakes of a vehicle, such as a mine haulage vehicle, that includes an emergency brake that is hydraulically actuated to bring the vehicle to a stop and prevent movement of the vehicle by interlocking actuation of the emergency brake with the transmission of power to the propelling mechanism so that when the vehicle is shut down the emergency brakes are automatically actuated preventing restoration of power to the propelling mechanism until the emergency brakes are manually released by operation of a safety brake valve.

Another object of the present invention is to provide a brake system adapted for use on an automotive vehicle having an emergency brake that is actuated by an operator controllable member to stop the vehicle and terminate transmission of power to driven wheels necessitating restarting the vehicle once the emergency brake has been actuated before the vehicle can be moved.

A further object of the present invention is to provide an emergency brake system for a mine haulage vehicle that includes a safety brake valve operable to automatically actuate engagement of the emergency brakes when power to the traction motors has been terminated to shut down the vehicle.

Another object of the present invention is to provide an emergency brake for a mine haulage vehicle in which operation of the emergency brake is interlocked with the transmission of power to the driven wheels of the vehicle so that the vehicle cannot be propelled once the emergency brakes are actuated and the emergency brakes must be manually disengaged before power can be restored to the driven wheels to restart the vehicle.

These and other objects of the present invention will be more completely disclosed and described in the following specification, the accompanying drawings and the appended claims.

DESCRIPTION OF THE PREFERRED EMBODIMENTS

Figure 1:
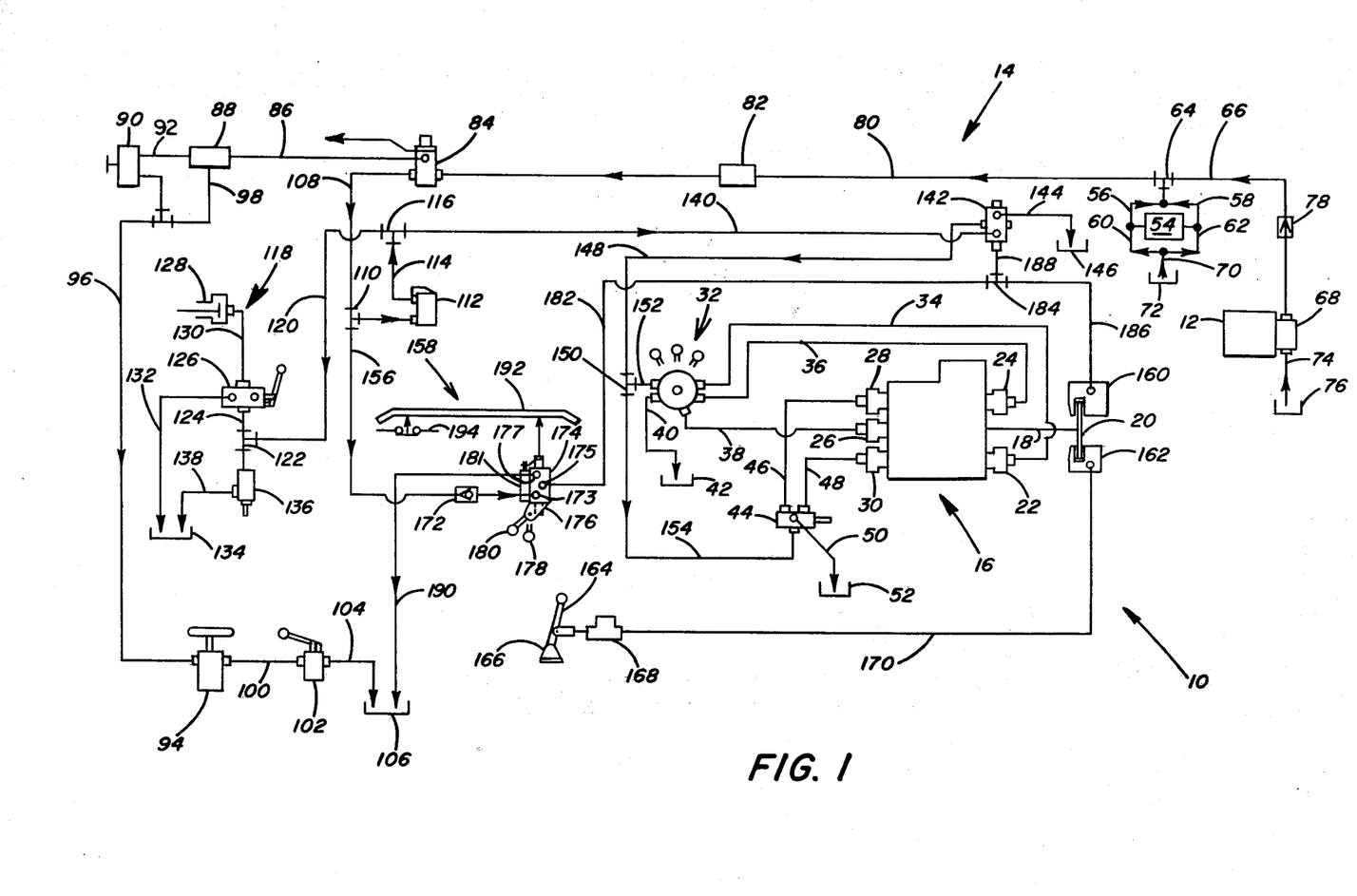
FIG. 1 is a diagrammatic view of the brake system of the present invention, illustrating the hydraulic circuitry of the brake system interlocked with the hydraulic transmission circuitry of a mine haulage vehicle.
Figure 2:
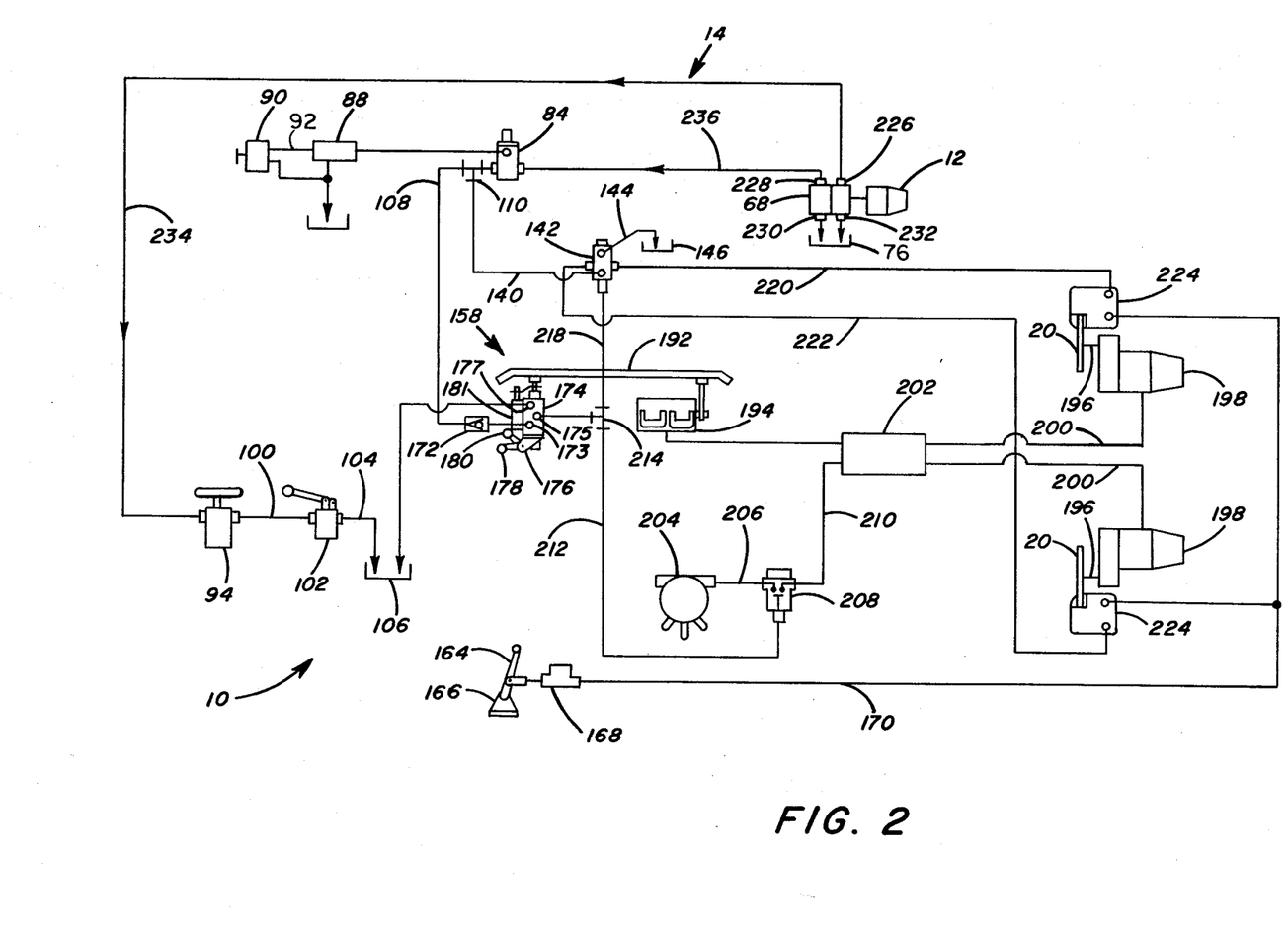
FIG. 2 is a diagrammatic view similar to FIG. 1 of the brake system of the present invention, illustrating the brake circuitry on a mine haulage vehicle interlocked with the electrical circuitry for actuating the vehicle traction motors.

Referring to the drawings in which like numerals refer to like parts in FIGS. 1 and 2, there is illustrated a brake system generally designated by the numeral 10 for applying a braking force to a vehicle. The features of the brake system, as shown in FIGS. 1 and 2, may be embodied in a mine haulage vehicle, such as a "shuttle car", especially designed for use in transferring loose material in underground mines. While the features of the present invention are especially adapted for use with a shuttle car, they are also adapted to be used with automotive vehicles of other types. A complete description of a mine haulage vehicle to which the brake system of the present invention may be adapted is illustrated in U.S. Pat. No. 2,754,015 which is incorporated herein by reference.

Referring to FIG. 1, there is illustrated an electric motor 12 of the A.C. or D.C. type and a continuous hydraulic circuit, generally designated by the numeral 14 for supplying hydraulic fluid under pressure from a hydraulic pump (later described) to the clutches of a multi-speed transmission 16. The control system hereinafter described is preferably a continuous pressure system requiring a preselected fluid pressure to the transmission 16 to provide tramming power. In addition, as will be later explained, the vehicle brakes are engaged by the energy stored in the brake system and require a preselected fluid pressure applied to the brake system to maintain the brakes disengaged. An output shaft 18 from the transmission 16 is drivingly connected in a conventionally known manner to the propelling means, such as driven wheel 20, of the powered vehicle. The multi-speed transmission 16, which may also be referred to as a fluid pressure operated control means, includes selective speed control clutches 22, 24 and 26. Clutch 22 is the low speed clutch, clutch 24 the intermediate speed clutch and clutch 26 the high speed clutch. The multi-speed transmission 16 also includes a forward drive clutch 28 and a reverse drive clutch 30.

The low, intermediate and high speed clutches 22, 24 and 26 are controlled by a change speed clutch valve 32. Conduits 34, 36 and 38 connect the low speed clutch 22, intermediate speed clutch 24, and high speed clutch 26 respectively to the change speed clutch valve 32. A return conduit 40 connects the valve 32 to a reservoir 42. Associated with the forward drive clutch 28 and reverse drive clutch 30 is a forward and reverse valve 44 that is connected to the respective clutches by conduits 46 and 48. A return conduit 50 connects the forward and reverse valve 44 with a reservoir 52. Thus, the vehicle propelling devices may be driven selectively at different predetermined speeds by operation of the change speed clutch valve 32 and in either direction by operation of the forward and reverse valve 44 at any speed through the multi-speed transmission 16 which the electric motor 12 operates at a constant speed.

A pump 54 is associated with the transmission 16 in the continuous hydraulic circuit 14 and is operable to deliver fluid under pressure to the transmission 16. The pump 54 has a pair of conduits 56 and 58 connected to conduits 60 and 62. Both of the conduits 56 and 58 are connected by means of a T connection 65 to a conduit 66 that is connected to the output of a pump 68, which provides a source of fluid under pressure driven by a motor 12. Both of the conduits 60 and 62 are connected to a conduit 70 which extends into a reservoir 72. Since the multi-speed transmission 16 is reversible, the pump 54 is also reversible and operable in two directions. Depending on the direction of operation, either the conduit 60 or 62 is the suction or low pressure conduit. Liquid is withdrawn from the reservoir 72 through conduit 70 through either conduit 60 or 62 to the pump and therefrom through conduit 58 or 56 respectively to the T connection 64 and main conduit 66.

Liquid under pressure is drawn through conduit 74 from a reservoir 76 by pump 68 and directed through check valve 78 in conduit 66 or from pump 54 to the T connection 64 to a conduit 80. The pressurized fluid flows through a filter 82 in conduit 80 to a relief valve 84 which limits the pressure from the pumps 54 and 68 to a preselected pressure. A conduit 86 connects the outlet side of relief valve 84 to a cable reel drive regulating valve 88 which is, in turn, connected to a cable reel motor 90 by means of conduit 92. The cable reel motor 90 propels the cable reel of the shuttle car in the desired direction. The outlet side of the cable reel motor 90 is connected to the inlet side of a power steering valve 94 by a conduit 96. A branch conduit 98 interconnects the bypass outlet side of the cable reel valve 88 with the conduit 96.

The outlet or return side of the steering valve 94 is connected by conduit 100 to a boom lift valve 102 that is operable to raise, lower or hold in a given position the boom or end frame of the shuttle car so that the end frame may pivot and vary the height of the discharge end of the endless flight conveyor that conveys the material within the material receiving compartment of the haulage vehicle in a longitudinal direction. A return conduit 104 connects the boom lift valve 102 to a reservoir 106. With the above described arrangement, the high pressures required to operate the cable reel, steer the vehicle and operate the boom will not scavenge pressure from the brake system. Thus, the brake system remains operable while these auxiliary functions are performed on the vehicle.

The outlet of the relief valve 84 is connected by conduit 108 to T connection 110 that diverts fluid through a pressure relief valve 112 and conduit 114 to T connection 116. With this arrangement, pressurized fluid is directed through that portion of the hydraulic circuit 14 that supplies pressurized fluid to the fluid pressure operated control means, such as the multi-speed transmission 16 and a fluid circuit generally designated by the numeral 118 for operating the endless flight conveyor of the mine haulage vehicle.

Briefly, the hydraulic circuitry for operating the vehicle conveyor receives pressurized fluid through conduit 120 to a T connection 122. A conduit 124 connects one outlet of the T connection 122 to the inlet of a conveyor actuator valve 126 which is connected with the conveyor clutch 128 by conduit 130. A return conduit 132 connects the conveyor actuator valve 126 with a reservoir 134. The other outlet of the T connection 122 is connected to a pressure relief valve 136 and conduit 138 that also leads to the reservoir 134.

Fluid at a reduced pressure, preferably at 125 p.s.i., is directed to the hydraulic circuitry of the transmission 16 from the T connection 116 into conduit 140 to the inlet of a pilot valve 142. The pilot valve has a first outlet connected by conduit 144 to a reservoir 146 and a second outlet through which pressurized fluid flows to conduit 148 to the multi-speed transmission 16. A T connection 150 diverts the fluid in a first direction through conduit 152 to the change speed clutch valve 32 and in a second direction through conduit 154 to the forward and reverse valve 44. In this manner the various transmission clutches 22, 24, 26, 28 and 30 are actuated by either pump 54 or 68.

When the vehicle is not in motion and the motor 12 is energized, the pump 68 conducts fluid under pressure through the conduits 66, 80, 108, 114, 140, 148, 152 and 154 to the above enumerated fluid pressure operated devices. On the other hand, when the vehicle moves, the pump 54 conducts fluid in proportion to the velocity of the vehicle to the multi-speed transmission 16. Because the output of pump 54 is proportional to the speed of the vehicle as the vehicle speed increases, the demand for fluid in the system increases and the output of pump 54 also increases.

Pumps 54 and 68 also supply fluid under pressure through conduits 80 and 108 to T connection 110 and conduit 156 of an emergency brake system generally designated by the numeral 158. The emergency brake system 158 includes fluid actuated brake means such a emergency stop-park brake 160 that is operatively associated with the propelling means such as driven wheel 20 so that upon actuation, in a manner hereinafter described, the emergency stop-park brake 160 when actuated frictionally engages the wheel 20 to bring the vehicle to a stop. Further, the emergency stop-park brake 160 is automatically actuated in accordance with the present invention when power to the propelling means is terminated and the vehicle is shut down, in a manner to be explained hereinafter in greater detail. Thus, one function of the emergency stop-park brake 160 is to prevent movement of the vehicle once the vehicle is stopped by application of a service brake 162. The emergency stop-park brake 160 is of the type illustrated and described in United States application, Ser. No. 641,941 entitled "Improved Brake Mechanism" which is incorporated herein by reference.

The service brake 162 operatively associated with the driven wheel 20 may be of the disc or drum type which when actuated provides a braking force to the moving vehicle. When the vehicle operator desires to slow the vehicle, the operator depresses an operator controllable member, such as brake pedal 164. The brake pedal 164 pivots about a fixed pivot 166. A master cylinder 168 is linked to the brake pedal 164 and is connected by a hydraulic line 170 to the inlet of service brake 162. Depressing the brake pedal 164 actuates the master cylinder 168 to provide pressurized fluid in line 170. The pressurized fluid is conducted to the service brake 162 to actuate the service brake to frictionally engage the driven wheel 20 to slow the vehicle or to bring the vehicle to a stop.

As stated hereinabove, the service brake 162 is operable to slow the vehicle while in motion and bring the vehicle to periodic stops during the haulage operation. However, the fluid actuated brake means, i.e., emergency stop-park brake 160 is intended for use in emergency situations only and to act as a parking brake when the vehicle is not in motion or is not intended to move while other functions on the vehicle are carried out, such as lifting of the boom and running the conveyor to unload the vehicle while positioned on an unloading ramp. The emergency stop-park brake 160 remains in a normally deactivated condition by the application of fluid pressure thereto at a preselected level which exceeds the system fluid pressure. For example, for a system of fluid pressure of 400 p.s.i., the emergency brake 160 is maintained at a fluid pressure of 600 p.s.i. to thereby assure that the brake remains disengaged when power is transmitted from either pump 54 or 68 through the multi-speed transmission 16 to the propelling means 20.

In order to maintain the emergency stop-park brake 160 released, pressurized fluid is continuously supplied to the brake 160 through the T connection 110 to the conduit 156. Fluid passes through conduit 156. The direction of flow in conduit 156 is controlled by a directional valve 172. Conduit 156 is connected to an inlet 173 of a brake actuator valve such as emergency brake valve 174 having a brake reset lever 176 operable in a first or run position 178 and movable to a second or park position 180. In the second park position 180 the emergency stop-park brake 160 is actuated, and the transmission of power to the propelling device 20 is terminated to prevent movement of the vehicle. In addition a safety brake valve 181 is operatively associated with the brake actuator valve 174 and is operable when power to the driven wheel 20 is terminated or electrical power to the system is terminated or a power failure occurs to automatically actuate the emergency stop-park brake 160. The brake reset lever 176 is moved to the park position 180 and in order to restore power to driven wheel 20 the lever 176 must be manually returned to the run position 178. It should be understood that the safety brake valve 181 even though illustrated as mounted externally on the brake actuator valve 174 may also be incorporated internally within the valve 174 to operate internally in the valve 174.

A first outlet 175 of valve 174 is connected to conduit 182 that, in turn, connects to a T connection 184 for supplying the fluid under pressure through conduit 186 to emergency stop-park brake 160 and conduit 188 to the pilot valve 142. With this arrangement, the conduits 182, 186 and 188 remain fully pressurized when the brake 160 is in a deactivated position. A second outlet 177 of the emergency brake valve 174 is connected by return conduit 190 to tank such as a reservoir 106.

An operator controllable, brake actuator lever 192 is mechanically connected to the emergency brake valve 174 and is located in the operator's compartment of the vehicle for convenient operation. The emergency brake actuator lever 192 is commonly referred to in the art of underground mine haulage vehicles as a panic bar. However, it should be understood that the term panic bar is not considered a limitation of the brake actuator lever 192. The brake actuator lever 192 may include other mechanical equivalents known to those skilled in the art. The panic bar 192 is also mechanically connected to the safety brake valve 181. The panic bar 192 when depressed actuates the emergency stop-park brake 160 in emergency situations only to bring the vehicle to a stop. It is not the function of the panic bar to be utilized for routine stopping and slowing of the vehicle. In the event the operator desires to bring the vehicle quickly to a stop, however, such as upon the occurrence of an emergency situation, application of a downward force to the panic bar 192 actuates the emergency brake valve 174 and the safety brake valve 181 to remove the fluid pressure from conduits 182 and 186. Reducing the fluid pressure in conduit 182 leading to the pilot valve 142 actuates the valve 142 to divert the flow of pressurized fluid from the change speed clutch valve 32 and the forward and reverse valve 44 in order to deny power transmission to the driven wheel 20. Also reducing the fluid pressure in conduit 186 actuates the emergency stop-park brake 160. To this end depressing the panic bar 192 conducts the flow of pressurized fluid from valve 174 through outlet 177 to the return conduit 190 and reservoir 106.

When hydraulic pressure is removed from conduit 182 by operation of the panic bar 192, the pilot valve 142 is actuated to divert flow from conduit 148 and the fluid actuated devices 32 and 44 to conduit 144 and reservoir 146. Preferably, the pilot valve 142 is actuated when the fluid pressure passing therethrough falls below a pressure in the range between about 450 to 500 p.s.i. Below this level the fluid actuated devices 32 and 44 are rendered inoperable so that the various transmission clutches 22, 24, 26, 28 and 30 are deenergized. In this manner the transmission 16 is disengaged for the transmission of power by the output shaft 18 to the driven wheel 20.

Simultaneously with terminating the flow of pressurized fluid to valves 32 and 44 the fluid pressure in conduit 186 is reduced to below the pressure for maintaining the emergency stop-park brake 160 in a deactivated condition. Therefore, for a reduction in operating pressure to emergency brake 160 below 400 p.s.i. the emergency brake is actuated to frictionally engage the wheel 20 and bring the vehicle to a stop. In addition to activating the emergency brake 160 and denying pressurized fluid to the fluid actuated devices 32 and 44 of the multi-speed transmission, the panic bar 192 moves the valve lever 176 to the park position 180 to assure that the vehicle will not move. In addition a reduction in the fluid pressure in the conduits 182 and 186 such as upon the occurrence of a power failure or a break in one of the conduits actuates the safety brake valve 181, which requires continuous pressure to remain open or deactivated to supply fluid to the conduits 182 and 186, to automatically apply the emergency stop-park brake 160.

Operation of the panic bar 192, however, does not deny fluid pressure to the fluid actuated valves 88, 94, 102 and 126 so that the functions of turning the cable reel and maintaining a preselected tension on the power cable, running the conveyor and lifting the boom while holding the boom in a given position may be carried out. The hydraulic pressure required to control these operations is entirely independent of the hydraulic system for controlling operation of the multi-speed transmission 16 and actuation of the emergency brake 160. This permits lifting of the boom and running the conveyor to unload while the vehicle remains stationary on an unloading ramp where it is absolutely necessary that the vehicle not move but the other operations of the vehicle be performed. This feature also permits testing of these operations during maintenance of the vehicle.

Not only is the panic bar 192 operable to interrupt the transmission of power through the multi-speed transmission 16 to the drive shaft 18 and the driven wheel 20, the panic bar 192 is also operable to remove the source of power to the electrically operable traction motors (not shown) of the vehicle. This is accomplished by interlocking the actuation of the emergency brake valve 174 and the safety brake valve 181 by the panic bar 192 with the operation of a safe-off switch 194, which when in a normally closed position completes the electrical circuit through the electrical controller to the traction motor. Depressing the panic bar 192 operates the safe-off switch 194 to open the main contactors of the electrical controller and deny current to the traction motors. Thus, by interlocking operation of emergency stop-park brake 160 with operation of the electrical controller and traction motors the vehicle cannot be propelled in the event there should be inadequate pressure for brake release or loss thereof. The vehicle cannot be propelled until the brake actuator valve 174 and the safety brake valve 181 are sufficiently pressurized and thereby opened to permit the flow of fluid under pressure to the emergency stop-park brake 160 to release the brakes from engagement with the driven wheel 20. It will be apparent that this feature of interlocking braking and tramming power prevents use of the emergency stop-park brake 160 as a service brake. Thus, the emergency brake will not receive significant wear and will be available when needed in emergency conditions.

Operation of the panic bar 192 moves the reset lever 176 associated with the valve 174 in the park position 180. In the park position the emergency stop-park brake 160 is applied to the driven wheel 20, and the driven wheel 20 is denied tramming power. To prevent use of the panic bar for routine stopping, simply restoring the panic bar to its normal position, as illustrated in FIG. 1, will not restore the fluid pressure to conduits 182 and 186 and release the emergency stop-park brake 160. The operator in order to restore the brake release circuit and close the circuit to the electrical controller for generation of tramming power must to manually move the lever 176 from the park position 180 to the run position 178. Thereafter, the main contactors of the electrical controller are energized by pushing the safe-off switch 194 to complete the electric circuit from the electrically controller to the traction motors. If the main contactors are energized to restore operation of the other devices on the vehicle, the lever 176 must be placed in the run position 178 to restore fluid pressure to the safety brake valve 181 to open the valve 181 and the brake actuator valve 174 to permit the flow of pressurized fluid to conduit 182. This releases the emergency stop-park brake 160 and operates the change speed clutch valve 32 and the forward and reverse valve 44 of the multispeed transmission 16.

Figures 3, 4:
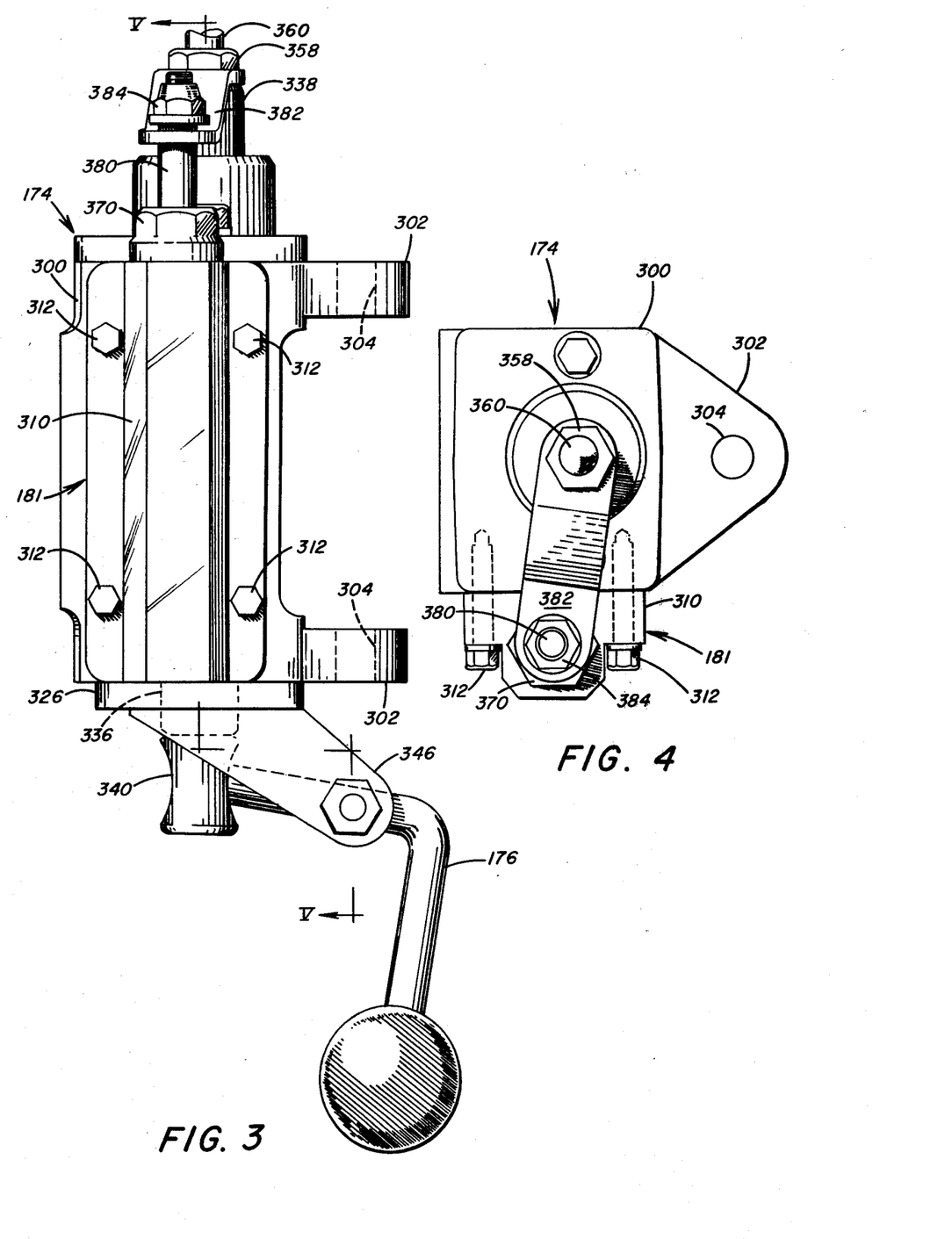
FIG. 3 is a view in side elevation of an emergency brake valve utilized in the brake systems of FIGS. 1 and 2, illustrating a brake reset lever for manually returning the brake valve from a park position to a run position after the emergency brake valve is actuated.
FIG. 4 is a top plan view of the emergency brake valve shown in FIG. 3.
Figure 5:
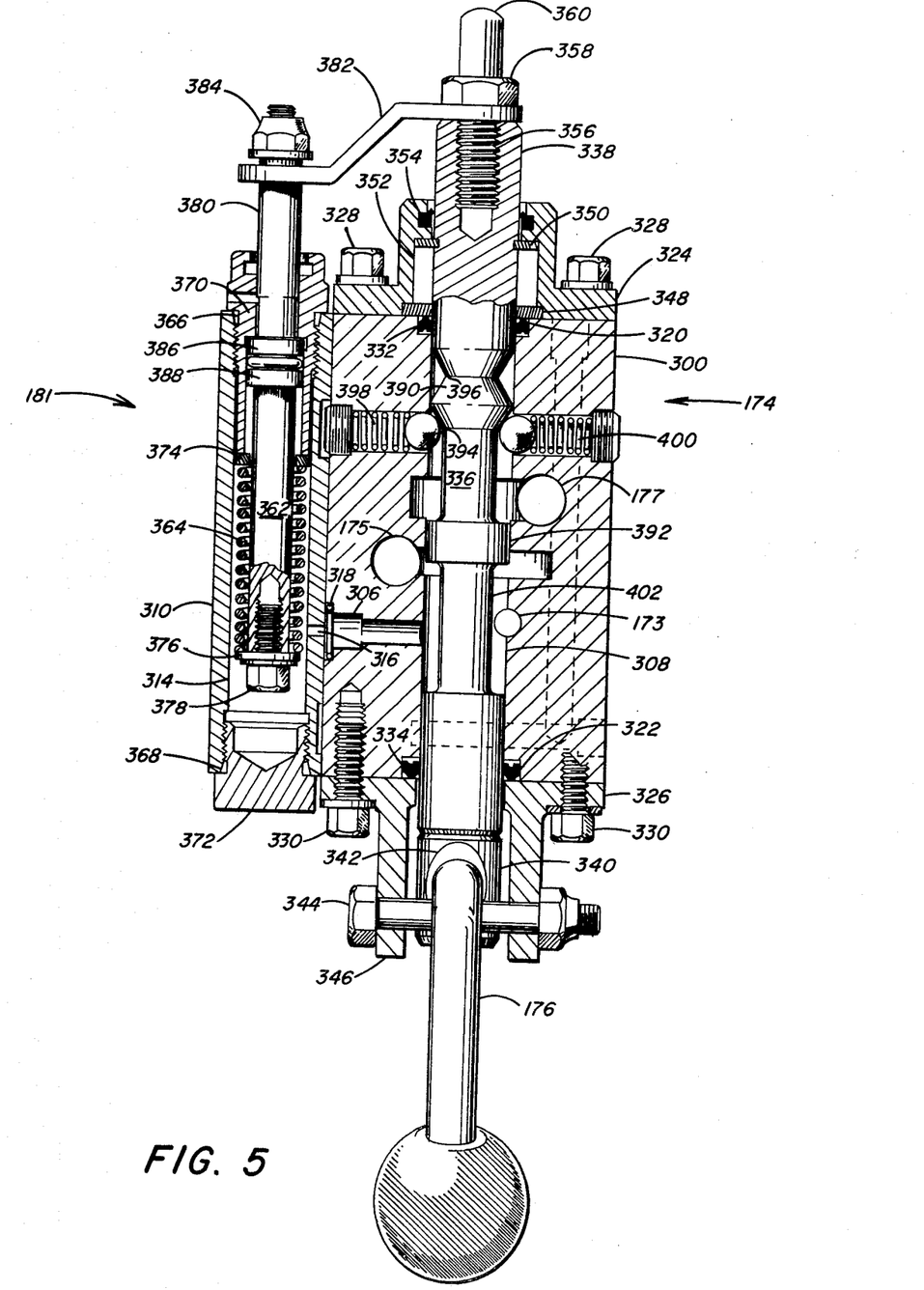
FIG. 5 is a sectional view of FIG. 3 taken along line V—V of FIG. 3, illustrating a safety brake valve for automatically actuating the emergency brake valve when power to the traction motors is terminated or a power failure occurs.
Figure 6:
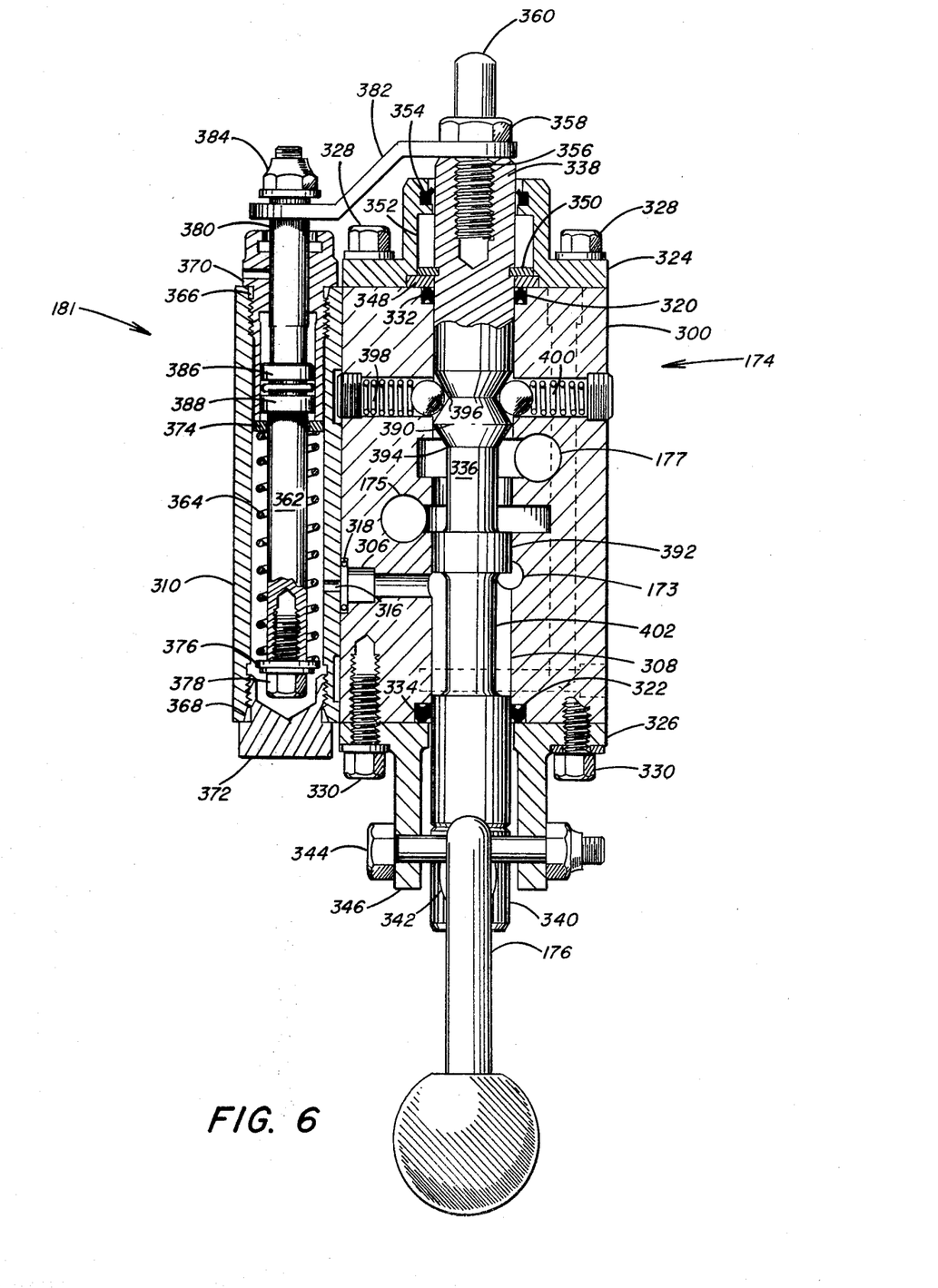
FIG. 6 is a view similar to FIG. 5, illustrating the brake reset lever in a park position and the safety brake valve in a closed position preventing restarting of the traction motors.

Now referring to FIGS. 3 and 4, there is illustrated in detail the brake actuator valve 174 and the safety brake valve 181. In accordance with the present invention the valves 174 and 181 are maintained in an open position, as illustrated in FIG. 5, by the continuous flow of pressurized fluid thereto to maintain the emergency stop-park brake 160 released and are automatically moved to a closed position, as illustrated in FIG. 6, when the fluid pressure in the brake release circuit falls below a preselected pressure to actuate the brake 160 to engage the wheel 20 and stop the vehicle. The brake actuator valve 174 includes a valve housing 300 having the inlet port 173, as illustrated in FIGS. 5 and 6, which in operation as illustrated in FIG. 1 is connected to conduit 156 for receiving pressurized fluid from the source. The housing 300 also includes outlets 175 and 177 for directing pressurized fluid to conduit 182 of the brake release circuit and to conduit 190 leading to tank, such as the reservoir 106, respectively. The housing 300 includes a pair of brackets 302 having apertures 304 for mounting the housing 300 in the operator's compartment of the vehicle. The housing 300 also includes a port 306 that communicates with a valve chamber 308 of the housing, as illustrated in FIG. 5. The inlet port 173 and outlet ports 175 and 177 are also arranged in fluid communication with valve chamber 308.

The safety brake valve 181 includes a valve housing 310 that is secured by bolts 312 to the housing 300 of valve 174. The valve housing 310 includes a valve chamber 314 having a port 316 that is arranged in fluid communication with valve port 306, as illustrated in FIG. 5 when the valve housing 310 is secured to valve housing 300. With this arrangement when pressurized fluid is introduced into valve chamber 308 from valve inlet port 173, pressurized fluid is also supplied to valve chamber 314 through communicating ports 306 and 316. An O-ring member 318 is positioned in port 306 to provide a fluid tight seal between the valve housings 300 and 310.

The valve housing 300 includes openings 320 and 322 at opposite ends of chamber 308. The openings 320 and 322 are closed by caps 324 and 326 which are secured to the housing 300 by bolts 328 and 330 respectively. Annular seal members 332 and 334 are positioned in the openings 320 and 322 to provide a fluid-tight seal around a spool-type valve member 336 which is positioned for longitudinal movement in the valve chamber 308. The valve member 336 includes an upper end portion 338 that extends out of the chamber opening 320 and a lower end portion 340 that extends out of the chamber opening 322. The lower end 340 includes an aperture 342 through which the end of the brake reset lever 176 extends. The lever 176 is pivotally connected by a bolt 344 to a bifurcated portion 346 of cap 326. A washer 348 surrounding the valve member upper end portion 338 maintains the seal member 332 in the opening 320. A retaining ring 350 is keyed to the valve member end portion 338 and is movable with the valve member in bore 352 of cap 324 to retain the valve member in the chamber 308. A seal member 354 positioned in the cap 324 sealingly engages the cylindrical surface of the valve member upper end portion 338.

The upper end portion 338 of valve member 336 includes a threaded bore 356 for threadedly receiving a bolt 358 to which is secured a rod portion 360. The rod portion 360 is operatively associated with the panic bar 192 illustrated in FIGS. 1 and 2. When the panic bar 192 is depressed to activate the emergency stop-park brake 160, the panic bar 192 contacts the rod portion 360 to, in turn, move the valve member 336 downwardly in the valve chamber 308 from the open position of valve 174, as illustrated in FIG. 5, to the closed position of valve 174, as illustrated in FIG. 6. In the open position of valve 174 the emergency stop-park brake 160 is released or disengaged and the brake reset lever 176 is in the run position. In the closed position of valve 174 the emergency stop-park brake 160 is engaged and the brake reset lever 176 is in the park position as illustrated in FIG. 6.

The safety brake valve 181 includes a valve member, such as piston 362 which is longitudinally movable in valve chamber 314. The piston 362 is normally maintained in an open or brake disengaged position, as illustrated in FIG. 5, when the ports 306 and 316 are in fluid communication with inlet port 173 and the outlet port 175 to thereby pressurize the valve chamber 314 at the fluid pressure of the brake release circuit. Thus, when valve chamber 314 is pressurized, a retractor spring 364 surrounding piston 362 is maintained in a compressed state. However, when the fluid pressure in chamber 314 and accordingly the fluid pressure of the brake release circuit falls below a preselected magnitude, as determined by the force exerted by spring 364 on piston 362, the spring 364 moves the piston 362 to the position illustrated in FIG. 6. This actuates the brake actuator valve 174 to, in turn, actuate the emergency stop-park brake 160 as described hereinabove.

The safety brake housing 310 includes openings 366 and 368 at opposite ends of chamber 314. The openings 366 and 368 are closed by a cylindrical retractor 370 and a retractor plug 372 which are threadedly secured to the valve housing 310. O-ring seals 374 and 376 surround retractor 370 and plug 372 in openings 366 and 368, respectively. The coil spring 364 abuts at its end portions a washer 374, which surrounds piston 362 and abuts the retractor 370 and a washer 376, which is retained on the lower end of piston 362 by a bolt 378.

The piston 362 includes an upper end portion 380 that extends through the retractor 370 and is connected by a lever 382 to the upper end portion 338 of valve member 336 of the brake actuator valve 174. The lever 382 is retained on valve member end portion 380 by nut 384 and on valve member end portion 338 by the bolt 358. With this arrangement, when the panic bar 192 is depressed by the machine operator to actuate the emergency stop-park brake 160 downward movement of valve member 336 is transmitted by lever 382 to move the valve member 362 downwardly in chamber 314 to the position illustrated in FIG. 6. Furthermore, when the vehicle is shut down either intentionally or as the result of a power failure, loss of fluid pressure in the brake release circuit and in the valve chamber 314 releases the spring 364 which extends to move the valve member 362 downwardly in chamber 314. Accordingly downward movement of valve member 362 is transmitted by lever 382 to valve member 336 to move valve member 336 downwardly in valve chamber 308. Downward movement of valve member 336 moves the brake reset lever 176 from the run position 178 to the park position 180, as illustrated in FIGS. 1 and 2. In this manner the emergency stop-park brake 160 is actuated and cannot be released until lever 176 is manually returned to the run position 178.

The piston 362 includes a pair of enlarged, longitudinally spaced annular portions 386 and 388 between which is positioned an O-ring seal which seals the upper end portion of fluid chamber 314 around the piston 362. The valve member 336 also includes enlarged, longitudinally spaced annular portions 390 and 392. On opposite sides of annular portion 390 are provided seats 394 and 396 which are arranged to receive a valve stop mechanism, such as spring biased detent devices 398 and 400. The detent devices are operable to engage the seats 394 and 396 to retain the valve member 336 in the brake disengaged position of FIG. 5 and the brake engaged position of FIG. 6, respectively. The detent devices 398 and 400 are suitably retained in the valve housing 300.

The valve member 336 includes a reduced diameter portion 402 between annular portion 392 and the valve member lower end portion 340. When the detent devices 398 and 400 engage the valve member seat 394, the portion of the valve chamber 308 surrounding the portion 402 places the inlet port 173 in fluid communication with the outlet port 175 and the brake release circuit. With this arrangement a continuous flow of fluid under pressure is supplied to the fluid pressure operated control means 16 and the emergency stop-park brake 160 so that the propelling mechanism is operable and the brake 160 is maintained released.

When the panic bar 192 is depressed or the safety brake valve 181 is actuated, due to either a termination of electrical power or to a loss of fluid pressure in the brake release circuit, the valve member 336 moves downwardly. This releases detent devices 398 and 400 from seat 394 and moves seat 396 opposite the devices 398 and 400. The devices 398 and 400 engage the seat 396 as illustrated in FIG. 6. Thus, the annular portion 392 seals the inlet port 173 from the outlet port 175 but places outlet port 175 in fluid communication with outlet port 177 and reservoir 106. In this manner the valves 174 and 181 are vented and the brakes 160 are applied to the driven wheel.

Further in accordance with the present invention it will be apparent from the above description of the brake actuator valve 174 and the safety brake valve 181 that when the propelling means of the vehicle is shut down a pressure loss occurs in the fluid pressure operated control means 16. Thus, the fluid pressure in valve chamber 314 of the safety brake valve 181 is reduced below the force of spring 364. Consequently, the valve members 362 and 336 are moved downwardly to the brake engaged position. Thus, the emergency stop-park brake 160 is automatically actuated when the vehicle is shut down. The propelling means can not be restarted until the brake reset lever 176 is manually moved from the park position to the run position. In the run position the respective valves 174 and 181 are moved to a position to restore the continuous flow of fluid under pressure from the source to the fluid pressure operated control means 16 and the emergency stop-park brake 160 to maintain the brake 160 disengaged.

A further embodiment of the present invention is illustrated in FIG. 2 in which like numerals of FIG. 2 refer to like parts of FIG. 1. The propelling means 20 are driven by shafts 196 that are drivingly connected to traction motors 198 that receive electrical power through conductors 200 from an electrical controller 202. The electrical controller 202 is energized by the on-off switch 194 that is linked to panic bar 192. A tram switch 204 provides directional control of the vehicle and is connected by conductor 206 to a fluid pressure operated control means such as a hydraulically actuated pressure switch 208. Conductor 210 connects the pressure switch 208 to the electrical controller 202. Fluid under pressure is supplied to the inlet of pressure switch 208 through conduit 212. Conduit 212 is connected by a T connection 214 to the outlet 175 of brake valve 174. The other outlet of T connection 214 is connected to conduit 218 that is, in turn, connected to an inlet of pilot valve 142. Conduits 220 and 222 extend from the outlets of pilot valve 142 and are connected to a fluid actuated brake means such as combination emergency and service brakes 224 that are operable to frictionally engage the driven wheels 20 to stop the vehicle.

In a manner similar to the hydraulic system illustrated in FIG. 1, motor 12 drives the pump 68 which in effect is a double pump having two outlets 226 and 228. The pump 68 has two suction sides connected by conduits 230 and 232 to reservoir 76. The high pressure outlet 226 is connected by a conduit 234 to the steering valve 94 and the boom lift valve 102. The flow from pressure outlet 228 supplies fluid through conduit 236 to the relief valve 84 for operation of the hydraulically actuated cable reel valve 88, the pilot valve 142, panic bar valve 174 and safety brake valve 181 as above discussed.

With the brake actuator lever or panic bar 192 maintained in a normal position as illustrated in FIG. 2, pressurized fluid is conducted from valve 174 to conduit 218 through pilot operated valve 142 to conduits 220 and 222 to maintain disengagement of the emergency brakes of the brake assemblies 224. In addition with the panic bar 192 in a normal position, pressurized fluid is conducted to the T connection 214 and conduit 212 to the pressure switch 208. Preferably, the pressure switch 208 is operable at a pressure greater than the brake release pressure to maintain the contacts of the switch 208 closed and thereby complete the circuit from the tram switch 204 to the controller 202 and therefrom to the traction motors 198.

Actuation of the panic bar 192 removes the pressure within the hydraulic circuit to the pilot valve 142 and the pressure switch 208. When the hydraulic pressure of the present invention in the circuit to the brakes 224 which includes fluid actuated brake means falls below the brake release pressure, the fluid actuated brake means are actuated to bring the vehicle to a stop. Simultaneously, reduction of pressure in the conduit 212 to the switch 208 below the brake release pressure, in the range between about 450 and 500 p.s.i., opens the circuit between the tram switch 204 and the controller 202 to thus prevent operation of the traction motors 198 and forward movement of the vehicle.

Simultaneously, with the above operation to bring the vehicle to a stop, the safe-off switch 194 is actuated by the panic bar 192 to open the electrical circuit to the controller 202 and terminate operation of the traction motors 198. Thus, by interlocking the actuation of the fluid actuated brake means with the supply of power from the electrical controller to the traction motors 198 through the panic bar 192, the vehicle is stopped and transmission of propelling power to the driven wheels 20 is denied. This assures that merely restoring hydraulic pressure to the circuit of the emergency brakes to release the emergency brakes will not restore the electrical circuitry for operation of the traction motors 198.

As with the arrangement for the brake system illustrated in FIG. 1, actuation of the brake actuator lever 192 moves the brake reset lever 176 from the run position 178 to the park position 180. To restore propelling power to the traction motors 198, the lever 176 must be manually set in the run position 178. Thereafter, the safe-off switch 194 must be restored to a safe position so that when the conduit 212 is again pressurized to actuate valve 208 and close the circuit between the tram switch 204 and the controller 202, electrical power is supplied to the traction motors 198 for driving the shafts 196 and propelling the wheels 20. In addition when the electrical power to the traction motors 198 is terminated the safety brake valve 181 is actuated to automatically engage the emergency brakes. The vehicle cannot be moved until the brake reset lever 176 is manually moved to the run position 178.

Thus, it will be apparent by the embodiments illustrated in FIGS. 1 and 2 a brake system is provided that insures emergency stopping of the vehicle by application of emergency brakes by an operator controlled brake actuator lever such as the panic bar 192, which also serves to terminate the transmission of power to the propelling devices. By interlocking operation of the means for transmitting power to the propelling devices and the emergency brakes through the brake actuator valve 174 and the safety brake valve 181, release of the emergency brakes alone will not restore the vehicle to movement. In addition, it is further required that the source of power for the traction motors be restored by manually restarting the traction motors. Further the emergency brakes are automatically actuated when the vehicle is shut down and are effective to hold the vehicle on grades and preclude tramming of the vehicle until fluid pressure in the brake release circuit is restored. Further, it is the feature of preventing movement of the vehicle when the emergency brakes are applied that assures that the emergency brakes will not be used when the vehicle is in motion. Thus, the emergency brakes will be available when needed and be protected from use as a service brake. Furthermore, it assures operation of other vehicle functions when the vehicle is intended to remain stationary or during maintenance of the vehicle.

According to the provisions of the Patent Statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A control system for automatically actuating a vehicle brake comprising, propelling means for the vehicle, fluid pressure operated control means for controlling the transmission of power to said propelling means, fluid actuated brake means for engaging said propelling means to brake the vehicle, a brake actuator valve, a fluid circuit for controlling the flow of fluid under pressure between a source of pressurized fluid and said brake actuator valve, said fluid actuated brake means, and said fluid pressure operated control means, said brake actuator valve having a valve housing with an inlet, a first outlet for pressurizing said fluid circuit, and a second outlet for venting said fluid circuit, a valve member movable in said valve housing between a brake disengaged position connecting said inlet with said first outlet for pressurizing said fluid circuit and a brake engaged position connecting said first outlet with said second outlet for venting said fluid circuit, said brake actuator valve being normally positioned in said brake disengaged position to supply said fluid actuated brake means and said fluid pressure operated control means with fluid under pressure to maintain said fluid circuit pressurized and said fluid actuated brake means in a disengaged position with respect to said propelling means and to supply drive to said propelling means, said brake actuator valve being movable upon actuation to said brake engaged position to direct said fluid under pressure from said first outlet to said second outlet to vent said fluid circuit so that said fluid actuated brake means engages said propelling means to brake the vehicle and interrupt drive to said propelling means, a safety brake valve having a valve member connected to said brake actuator valve, said safety brake member being positioned in said fluid circuit and subjected to the fluid pressure applied to said fluid actuated brake means and said pressure operated control means, said safety brake valve member being operable to maintain said brake actuator valve positioned in a brake disengaged position when said fluid pressure supplied to said fluid pressure operated control means in said fluid circuit exceeds a preselected pressure, and said safety brake valve member being actuated when said fluid pressure applied to said fluid pressure operated control means in said fluid circuit decreases to said preselected pressure to move said brake actuator valve to a brake engaged position to stop the vehicle and prevent restarting of the vehicle until said fluid pressure in said fluid circuit is increased above said preselected pressure.

2. A control system for automatically actuating a vehicle brake as set forth in claim 1 which includes, a brake actuator lever connected to said brake actuator valve member and said safety brake valve member, and said brake actuator lever being operable to manually actuate said brake actuator valve and said safety brake valve to vent fluid under pressure from said fluid actuated braking means and said fluid pressure operated control means to brake the vehicle and terminate drive to said propelling means.

3. A control system for automatically actuating a vehicle brake as set forth in claim 1 which includes, a brake reset lever connected to said brake actuator valve member, said brake reset lever being movable to a brake engaged position upon engagement of said fluid actuated braking means to maintain said brake in an engaged position, and said safety brake valve member being operatively connected to said brake actuator valve member so that upon actuation of said safety brake valve and brake actuator valve is actuated to move said brake reset lever to a brake engaged position.

4. A control system for automatically actuating a vehicle brake as set forth in claim 3 which includes, said brake reset lever being operable to maintain said brake actuator valve and said safety brake valve in a brake engaged position until fluid under pressure is restored to said fluid pressure operated control means after the vehicle is stopped.

5. A control system for automatically actuating a vehicle brake as set forth in claim 1 in which, said safety brake valve member being responsive to the fluid pressure of said fluid pressure operated control means, and said safety brake valve being operable when the fluid pressure of said fluid pressure operated control means decreases to said preselected pressure to actuate said brake actuator valve to move to a brake engaged position to permit said fluid actuated brake means to engage said propelling means and stop the vehicle.

6. A control system for automatically actuating a vehicle brake as set forth in claim 1 in which, said safety brake valve includes a biasing means for moving said safety brake valve member to a brake engaged position to thereby actuate said brake actuator valve to engage said fluid actuated brake means with said propelling means to brake said vehicle.

7. A control system for automatically actuating a vehicle brake as set forth in claim 6 which includes, said safety brake valve member being normally maintained by said fluid under pressure of said fluid pressure operated control means in a brake disengaged position overcoming said biasing means, and said biasing means being operable to move said safety brake valve member to a brake engaged position when the fluid pressure of said fluid pressure operated control means decreases to said preselected pressure so that the vehicle is automatically stopped by engagement of said fluid actuated brake means with said propelling means.

* * * * *